Patented Oct. 2, 1951

2,569,932

UNITED STATES PATENT OFFICE 2,569,932

CROSS-LINKED HYDROLYZED INTERPOLYMER OF VINYL ACETATE AND ALLYLIDENE DIACETATE AND PROCESS

Emmette Farr Izard, Kenmore, N. Y., assignor to E. I. du Pont de Nemours & Company, Wilmington, Del., a corporation of Delaware No Drawing. Application November 21, 1945, Serial No. 630,132

3 Claims. (Cl. 260—67)

1

This invention is concerned with synthetic polymers and it pertains particularly to the formation of insoluble products from polymers containing reactive aldehyde groups.

This application is a continuation-in-part of my copending application Serial No. 581,340, filed March 6, 1945 (now U. S. P. 2,485,239).

As I have pointed out in my said copending application Serial No. 581,340 (U. S. P. 2,485,239) and in my copending applications Serial Nos. 581,337, (now abandoned), 581,338 (U. S. P. 2,467,430) and 581,339 (now abandoned), all filed March 6, 1945, linear polymers which may be of very high molecular weight can be prepared by polymerizing chemical compounds containing a carbon-to-carbon unsaturation and having a group of radical which is inactive to polymerization, said polymers being convertible to polymers containing aldehyde groups by saponification, hydrolysis or alcoholysis of the said inactive groups. In view of the inert character of said inactive groups with respect to polymerization and their ready conversion to aldehyde groups, said inactive groups are termed "masked aldehyde" groups. Allylidene diacetate may, in accordance with the disclosure of my said copending applications, be readily polymerized to yield a polymer containing the "masked aldehyde" groups which, upon removal of the masking groups, yield aldehyde groups which are present in the polymer in recurring acrolein chain units. From crotylidene diacetate, polymers containing recurring crotonaldehyde chain units may be prepared in a similar fashion and similar polymers containing cinnamylaldehyde chain units and chain units of other aldehydes may also be prepared. In place of the "masking" acetate groups of allylidene diacetate, other masking groups may be used in the monomer which is polymerized to the masked aldehyde group-containing polymer. The various polymers containing masked aldehyde groups, when prepared as described in my said copending applications, may be readily treated to unmask the said groups and form long, straight chain polymers having in the molecule a number of aldehyde groups which are highly reactive, the said converted polymers being soluble in many common liquids. Unsaturated aldehydes such as acrolein, methacrolein and crotonaldehyde contain a carbon-to-carbon unsaturation indicating a readiness to polymerize, but in the polymerization of these aldehydes, both the carbon-to-carbon unsaturation and the aldehyde groups enter into the polymerization with the rapid formation of in-

2 fusible, insoluble products of relatively low molecular weight which, because of their infusibility and insolubility, have very little utility.

It is an object of this invention to convert polymers containing reactive aldehyde groups into polymers having different physical and chemical characteristics. A further object of the invention is concerned with the treatment of polymers containing recurring aldehyde groups to convert them into products having very low solubility in many common solvents. Another object of the invention relates to the production of shaped products such as filaments and films having high resistance to the action of common solvents and heat, from polymers containing aldehyde groups. A still further object is concerned with the cross-linking of polymers containing aldehyde groups to form larger molecules.

The objects of the invention may be accomplished by causing the aldehyde groups of polymers containing the same to react with aldehyde-reactive groups, e. g. hydroxy groups, contained in the polymer molecule or contained in other compounds which may or may not be polymeric, in the presence of an agent such as an acid and/or heat which acts as a catalyst to promote the reaction. When the polymer contains both aldehyde and hydroxy groups, different molecules of the polymer link up directly with each other to form larger molecules. When the aldehyde groups of the polymer are reacted with compounds containing two or more aldehyde reactive groups (polyfunctional compounds), said polyfunctional compounds react with and condense with the aldehyde groups of separate molecules of the polymer thereby effecting a combination of the polymer molecules to build up molecules of greater molecular weight. The aldehyde group-containing polymer molecules may also be converted into molecules of higher molecular weight by reactions in which the aldehyde groups of the polymer interact to effect chemical union between polymer molecules. Such polymers of higher molecular weight prepared as described possess properties different from those of the aldehyde-containing polymer, having in many instances a much greater resistance to the action of common solvents and, for that reason, may be applied to many uses to which the aldehyde-containing polymers are not adapted. The cross-linking reactions referred to may take place during or after shaping of the polymer into any desired form.

The invention can be readily understood by the following explanation of the chemical reactions involved in the making of polymers containing the masked aldehyde groups, in the conversion of such polymers to polymers containing aldehyde groups and in the reaction between the aldehyde groups of such polymers and the aldehyde reactive groups. Thus, allylidene diacetate and vinyl acetate, when mixed in a mol ratio of 1:2, interpolymerize to produce an ethyl alcohol-soluble polymer having the following structure:

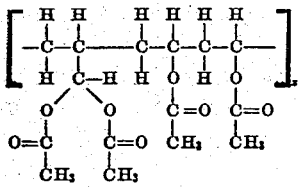

This structural formula is designated as Formula 1 and assumes a head-to-tail linking of allylidene diacetate and vinyl acetate such as occurs in the polymerization of vinyl acetate by itself, allylidene diacetate likewise presumably polymerizing by itself in the same head-to-tail fashion. The carbon atoms in the horizontal chain of Formula 1 are chain carbon atoms for convenience. Upon hydrolysis, saponification or alcoholysis in an alkaline medium, the ester groups are removed to yield a product having the polymer chain structure:

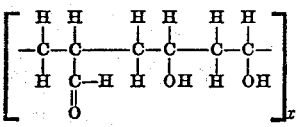

This structural formula is designated as Formula 2. This polymeric compound is stable, provided it is not subjected to elevated temperature and/or acid conditions. In an acid medium, this intermediate product automatically cross-links with the liberation of water to form an insoluble, substantially infusible product, such as is represented by the following structure:

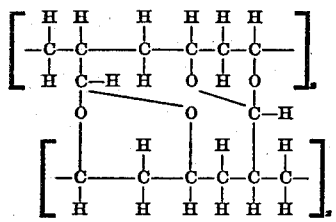

This structural formula is designated as Formula 3.

The subscript "$x$" occurring in the above Formulas 1, 2 and 3 represents the number of chain units in the polymer molecule.

While the "masked" aldehyde group

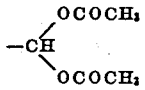

is shown directly connected to the polymeric chain, and compounds of this general type are preferred in view of the availability of materials and simple synthesis, but the invention is not so limited. The above or an equivalent masked aldehyde group may be connected to the chain carbon atom either directly as shown above in Formula 1, or through one or more carbon atoms, or through any line of attachment that is free of hydrolyzable linkage, i. e. free of a linkage that will be severed by hydrolysis, saponification or alcoholysis. The importance of non-hydrolyzable linkage is obvious for, if hydrolysis, or alcoholysis or saponification which unmasks the aldehyde group also breaks the linkage between the aldehyde group and the polymeric chain, the polymer loses its aldehydic character and the properties flowing from the presence of aldehyde groups in the polymer molecule.

Thus, it is important in the polymers which can be saponified to yield aldehyde groups, that the polymeric structure contain a dangling carbon atom having two valences saturated with hydrolyzable groups which take no part in the polymerization reaction. Allylidene esters and alpha-substituted allylidene esters constitute a preferred family of compounds capable of being polymerized to yield linear addition polymers of this character. Allylidene diacetate may be prepared by reacting acrolein with excess acetic anhydride. Acrolein ($CH_2=CH-CHO$) contains the double bond needed for linear addition polymerization, but the aldehyde group interferes with direct polymerization as stated above. The aldehyde group must therefore be covered or "masked" to prevent it from reacting and interfering with the synthesis of the linear polymer. The attachment of two ester groups is simple and generally preferred, but the aldehyde may otherwise be immobilized or "masked," e. g. the aldehyde may be covered by other groups such as ether, thioether or halogen groups, or by any combination of "masking" groups, e. g. in part by an ester group and in part by other masking groups, and used with very satisfactory results.

In the illustration given above, both cross-linking groups (—CHO and —OH) are present or potentially available in the same polymer and generally, this is desirable but not at all necessary in order to have synthetic addition polymers of improved utility. Many polymers, natural and synthetic, have hydroxyl groups that will cross-link with the aldehyde groups contained in the polymer that may be formed through the practice of this invention. For instance, cellulose, partially substituted cellulose derivatives, glycol cellulose, polyvinyl alcohol or interpolymers thereof are excellent materials with which to effect cross-linkage. Furthermore, there are numerous polyfunctional compounds such as di- and polyhydric alcohols, e. g. glycerol, the glycols, polythioalcohols and diamines which may be used effectively to cross-link polymers formed through the practice of this invention when the polymer itself contains no hydroxyl groups. In some cases, it may even be desirable to effect cross-linking reactions such as were just previously discussed, even though the polymer itself contains hydroxyl groups.

To produce polymers of certain solubility characteristics, the masked aldehyde compound may be interpolymerized with a major proportion of certain other ethylenic compounds having the desired solubility characteristics so that the aldehyde-containing polymer eventually formed may be used more advantageously. In the case of interpolymers of allylidene diacetate and vinyl acetate for example, a high mol ratio of vinyl acetate to allylidene diacetate, such as 10:1 or 20:1, gives polymers which, upon saponification, are readily water soluble. After such polymers have been saponified and then subjected to cross-linking under such conditions as to consume all of the aldehyde groups, there will still remain free a large percentage of the original hydroxyls which confer on the polymer relatively high water sensitivity (a large capacity for swelling in water) even though the polymer is no longer water soluble. In such cases, it may be desirable to acetalize all or part of the remaining hydroxyls with an aldehyde such as formaldehyde, acetaldehyde, butyraldehyde, etc. Sometimes it may be advantageous to have both cross-linking groups present in the ultimate polymer to only a minor extent, in which case a three or four component polymer may be produced.

This invention utilizes generally synthetic linear addition polymeric compounds containing in the chain the group:

(A)

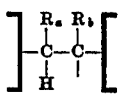

wherein $R_a$ and $R_b$ are monovalent atoms or radicals, e. g. hydrogen, halogen, aryl, aralkyl or substituted or unsubstituted, saturated or unsaturated, open chain or cyclic alkyl and are preferably hydrogen, halogen or a saturated aliphatic hydrocarbon radical, the said group having joined thereto through the valence shown in the formula as unsatisfied and through a line of attachment free of hydrolyzable linkage the group:

(B)

wherein $R_1$ and $R_2$ are acyloxy (including aroyloxy), alkoxy, alkylthio, aralkoxy, aralkylthio or halogen and both $R_1$ and $R_2$ are free of unsaturated acyclic carbon-to-carbon bonds. In order that the line of attachment be free of hydrolyzable linkage, the group (B) must be directly connected to carbon which may or may not be the carbon of the polymeric chain. In the preferred embodiment of this invention, group (B) is directly connected to group (A). Examples of monomeric compounds capable of forming this type of polymer are allylidene diacetate, 2-methallylidene diacetate, 2-phenyl allylidene diacetate, allylidene acetate-chloride, allylidene acetate-ethoxide, 2-chloroallylidene diacetate, allylidene dipropionate, crotylidene diacetate, cinnamylidene diacetate, acrolein diethoxide, acrolein chloride-ethoxide, acrolein dichloride, vinyl dioxolane, allylidene dibenzoate, allylidene benzoate-acetate, allylidene benzoate-ethoxide, vinyl benzylidene diacetate and vinyl naphthal diacetate.

While the above-mentioned monomeric compounds may be polymerized alone, it is generally preferred to interpolymerize one of these compounds with one or more ethylenic compounds having the general formula:

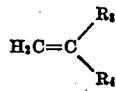

where $R_3$ is hydrogen, halogen or methyl and $R_4$ is hydrogen, halogen, methyl, methoxy, cyano, alkenyl, substituted alkenyl, alkynyl, acyloxy, acylthio, carbalkoxy, acyloxalkyl, aryl, aralkyl, carbazyl, or pyridyl. Satisfactory interpolymerizing compounds include vinyl acetate, vinyl thioacetate, vinyl chloride, vinyl cyanide, vinyl fluoride, styrene, butadiene, chloroprene, isobutylene, methylacrylate, methyl methacrylate, vinylidene chloride, ethylene, vinyl acetylene, vinyl carbazol, vinyl pyridine, etc.

Where monomeric compounds are used as the starting materials, polymerization may be carried out in any suitable manner commonly practiced for the production of polymeric vinyl compounds. As previously stated, the allylidene ester or the like may be polymerized alone, in which case the polymer will contain only masked aldehyde groups, or it may be interpolymerized with other unsaturated compounds which may or may not contain masked hydroxyls. If desired, two, three or more interpolymerizing compounds may be combined with the masked aldehyde compound. The mol ratio of the masked aldehyde compound to the other interpolymerizing ingredient may vary widely, for instance from 1:2 to 1:20, more or less, depending upon the specific characteristics desired. Also, the degree of polymerization may range widely, the polymeric compounds having molecular weights of from 1,000 to 100,000 or more.

The present invention embodies the reaction with hydroxy groups or other aldehyde reactive groups, of the aldehyde groups of the polymers containing recurring aldehyde groups attached to a chain carbon through non-hydrolyzable linkage. When these polymers also contain free hydroxyl groups, they are capable of being cross-linked into an insoluble and infusible or difficultly fusible form. In order that the aldehyde group be reactive, it must be joined to the polymeric chain through a carbon-to-carbon bond, i. e. the structure:

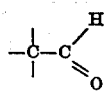

must be present. The aldehyde carbon may be connected directly to the polymeric chain carbon, or it may be connected to the chain carbon through one or more additional carbons or through oxygen, so long as the linkage is free of hydrolyzable groups. When connected through oxygen, the other two valences of the carbon atoms adjacent the oxygen must be satisfied only with monovalent members, e. g. hydrogen or hydrocarbon, for if satisfied by oxygen or the like, the side chain will be split off upon hydrolysis. When adjacent connectors are carbon, a carbonyl group is not objectionable.

The aldehyde groups may be formed from the masked aldehyde group-containing polymer of the type previously set forth by hydrolysis in acid medium, by acid catalyzed alcoholysis, by saponification in an alkaline medium or by an alkaline catalyzed alcoholysis. (For convenience, the term "hydrolysis" can be used to designate the "unmasking" reaction where a general term is desired for the purpose of referring to this reaction although the term "hydrolysis" is frequently given its more restricted meaning throughout this specification.) Hydrolysis or alcoholysis in acid medium is preferably confined to those polymers containing no masked hydroxyls. Otherwise, the unmasked aldehyde and hydroxyls will immediately react in the acid medium to cross-link and insolubilize the structure. However, the acid method is not only entirely satisfactory, but the acid catalyzed alcoholysis method is preferred where there are no masked hydroxyl groups in the initial polymer.

Whenever the aldehyde group is masked in an interpolymer by an acetal, hydrolysis or alcoholysis is somewhat more difficult and it must be carried out in an acid medium. It is desirable therefore if interpolymers are involved which have no masked hydroxyls present to interfere with the reaction in acid medium.

Half acetals such as polyallylidene acetate-ethoxide may be hydrolyzed or saponified either in alkaline or acid medium. When the alkaline saponification or alcoholysis is used, the masked aldehyde may not be unmasked immediately, for while the ester group is readily replaced by hydroxyl, the ether group may remain intact for a time although eventually the aldehyde will be unmasked.

The following examples which are illustrative rather than limitative describe various methods of applying the principles of this invention. In these examples, as well as throughout the specification, parts, proportions and percentages are by weight unless otherwise specified.

Examples A, B and C represent typical methods for preparing linear polymers containing both aldehydes and hydroxy groups which may be cross-linked in accordance with the preferred embodiment of the invention.

Example A

A mixture of 860 grams of vinyl acetate, 160 grams of allylidene diacetate, 1,800 grams of water, 2 grams of sodium bicarbonate and 1 gram of polyvinyl alcohol (obtained by hydrolyzing polyvinyl acetate until the molecule contains 11% of the maximum theoretical acetyl content) was heated to reflux for five minutes to drive all air out of the system and 1 gram of benzoyl peroxide catalyst was added. The mixture was heated with stirring at the reflux temperature for a total of eight hours at which time the product was refluxing at 90° C. Evidently, all the vinyl acetate had been consumed. The product was cooled to room temperature, with stirring, and then allowed to settle. After washing by decantation and air drying, the polymer was found to weigh 790 grams. The product is an interpolymer of allylidene diacetate and vinyl acetate.

This polymer (790 grams) was dissolved in 2,000 cc. of methanol by stirring at 60° C. To this solution was added portionwise a solution of 40 grams of sodium hydroxide in 360 grams of methanol. During the addition of about half of the sodium hydroxide, the pH did not change materially and did not rise above 7.0 to 8.0. (This indicates the rapid saponification of some component of the polymer and is believed to be due to the more rapid saponification of the allylidene diacetate portion.) Continued addition of sodium hydroxide eventually brought the pH up to 9.0 to 10.0 at which point a mild yellow color developed in the solution and in about fifteen minutes at 55° C., cloudiness developed, quickly followed by considerable thickening of the solution. Finally, the solution "broke," solid polymer separated out and the viscosity dropped very rapidly due to the fact that all the polymeric material rapidly came out of solution as saponified product. In order to insure complete alcoholysis, heating was continued for two hours at 55° C. with periodic additions of sodium hydroxide to keep the pH near 10.0. After two hours, the product was separated from the alcohol by filtration, washed thoroughly to remove the reaction by-products and then dried in air. The air dried product weighed 376 grams and was readily soluble in water. However, this polymer would tolerate considerable alcohol and the alcohol wet polymer first produced rapidly dissolved in water to give a very satisfactory solution.

The caustic-alcohol treatment described in this example constitutes an alcoholysis effecting splitting off of the ester groups such as was shown in Formula 1, with the unmasking of the hydroxyl and the aldehyde groups as was shown in Formula 2, methyl acetate being largely produced during the reaction.

The above example (using polyvinyl alcohol as a dispersing agent with sodium bicarbonate being optionally present as a buffer to prevent the pH from going too low during polymerization) embodies the dispersion method for preparing a masked aldehyde polymer containing combined vinyl acetate and combined allylidene diacetate in the mol ratio of 10:1, which is subsequently converted to a saponified polymer containing ten hydroxy groups to each aldehyde group in the polymer. The following Example B represents the solution method applied to the preparation of a polymer containing combined vinyl acetate and combined allylidene diacetate in the mol ratio of 10:2, the saponified polymer containing ten hydroxy groups for each two aldehyde groups.

Example B

A mixture of 86 grams of vinyl acetate, 32 grams of allylidene diacetate, 0.2 gram of benzoyl peroxide and 100 grams of toluol was heated to reflux to bring about polymerization. Polymerization slowly proceeded as was evidenced by an increase in the boiling point of the solution. Polymerization by the solution method of this example appears to be slower than in the bulk process, i. e. wherein no solvent is used, the resulting polymer being an interpolymer of vinyl acetate and allylidene diacetate dissolved in toluol. The masked aldehyde polymer thus prepared may be saponified as in Example A to yield a polymer containing aldehyde and hydroxy groups.

The following Example C represents the preparation of the masked aldehyde-containing polymer by the bulk process as distinguished from that of Examples A and B.

Example C

A mixture of 36 grams of vinyl acetate, 36 grams of allylidene diacetate and 0.36 gram of benzoyl peroxide was heated to reflux on a steam bath. Polymerization started in about fifteen minutes and proceeded normally and rapidly. After the vigorous reaction was over, the mixture was heated on a steam bath for sixteen hours to insure complete polymerization. The product was soluble in methanol and other lower aliphatic alcohols, methoxyethanol, ethyl acetate, toluol, etc. and had a very low viscosity. The product of this example is an interpolymer of vinyl acetate and allylidene diacetate in which the respective compounds are present in the polymer in a ratio which, after saponification, will produce hydroxyl and aldehyde groups substantially in the theoretical ratio for complete cross-linking of both groups.

This polymer was dissolved in 200 cc. of methanol. To make this solution alkaline, 50% aqueous caustic was cautiously added. During the addition of this caustic and subsequent refluxing, no evidence of coagulation appeared. The caustic solution was continually added until a total of about 10 grams of sodium hydroxide had been added. During this addition, some darkening of the product took place, but it did not become water soluble. (However, the addition of a small amount of hydrochloric acid to the alcohol solution to make it acid resulted in immediate gelation to an alcohol-insoluble product. In this case, saponification or alcoholysis had taken place, but the product was not soluble in water.) The product was finally coagulated by pouring the solution into cold water and washing several times with water to remove by-products. This precipitated product would not redissolve in methanol nor in water alone, but did redissolve in a 50% aqueous methanol solution. Acidification of this water-alcohol solution as above described resulted in immediate gelation, indicating the presence of both aldehyde and alcohol groups.

It will be understood that any suitable method of preparing the masked aldehyde-containing polymer and the polymer containing aldehyde groups may be used.

Example I

A copolymer of vinyl acetate and allylidene diacetate containing a ratio of ten mols of combined vinyl acetate to one mol of combined allylidene diacetate is prepared or is converted to the polyvinyl alcohol-acrolein derivative (the polymer containing hydroxyl and aldehyde groups) by alkaline methanolysis (e. g. as described in Example A). The resulting product is dissolved in water to give a casting solution containing 15% by weight of the polymer. A portion of this solution is acidified by the addition thereto of 0.15% of sulfuric acid (1.84 specific gravity), after which addition the solution gels almost immediately, indicating cross-linking. Another portion of the solution is cast in the form of a film on a glass plate; this film is baked at 100° C. for sixteen hours at which time the film is no longer soluble even in boiling water, but is swollen by water; this alternative procedure represents cross-linking without the addition of acid, elevated temperature alone serving to effect condensation of the aldehyde and hydroxyl groups.

Example II

A copolymer containing vinyl acetate and allylidene diacetate in the mol ratio respectively of 10:2 and saponified as in Example A to yield the polyvinyl alcohol-acrolein derivative is made into a 15% aqueous solution and is cast into film on a glass plate and dried in air at room temperature (75° F.). The film is placed in a warm bath of 5% aqueous sulfuric acid saturated with sodium sulfate for about five minutes. The film remains intact and when washed with hot water, expands slightly and comes off the plate, but is not soluble even in boiling water. In a similar experiment, film is cast from a 15% aqueous solution of a saponified 10:1 vinyl acetate-allylidene diacetate copolymer and insolubilized in the same way by treatment with a 5% aqueous sulfuric acid saturated sodium sulfate bath at 60° C.

Example III

A piece of ordinary cambric is washed free of size and then impregnated with the 15% aqueous solution of saponified 10:1 vinyl acetate-allylidene diacetate copolymer used in Example I. The fabric is dried in air and then treated with the 5% aqueous sulfuric acid saturated sodium sulfate bath as in Example II. The fabric is washed free of acid and then dried in air. The stiffness of the fabric indicates that it has been well sized by the treatment and the size does not boil out with hot water.

Example IV

A 15% solution of saponified 10:2 vinyl acetate-allylidene diacetate copolymer (that used in Example II) in water is mixed with 2.5% maleic acid (based on the weight of the solution). When allowed to stand at room temperature, this mixture gels within thirty minutes. With a similar solution containing 0.5% maleic acid, the mixture is more stable and a solution is cast into film on an amalgamated tin plate. The film is dried in air and then baked at 80° C. for an hour. This film is highly swollen by hot water, but not quite dissolved. A similar film is baked at 80° C. for three hours and becomes insoluble in boiling water, but is swollen. In a further test where the film is baked for five hours, the swelling in water is appreciably less.

To a part of the 15% aqueous polymer solution (without maleic acid) used in the preceding paragraph, 1% ammonium chloride (based on the weight of the solution) is added and a film cast on amalgamated tin, dried at 80° C. and baked for one hour. The film is insoluble in boiling water and appears to be equivalent to a five hour bake with maleic acid. Another film cast in a similar way and dried at room temperature becomes insoluble in boiling water. In another test, to a portion of the same 15% aqueous solution of polymer is added 1% ammonium chloride and the solution is allowed to stand at room temperature. This solution is stable for a few hours, but gels on standing overnight (sixteen hours).

Example V

An aqueous solution containing 5% of the 10:1 saponified vinyl acetate-allylidene diacetate copolymer of Example I is used to impregnate both No. 1 and No. 5 Whatman filter papers. The excess solution is removed by carefully blotting with paper towels and the papers allowed to dry in air. The dried paper is then immersed for five minutes in an aqueous bath saturated with sodium sulfate and containing 5% sulfuric acid at 60° C. This treatment is sufficient to insolubilize the polymer and the paper can then be washed thoroughly to remove acid and salt. These treated papers are several hundred per cent stronger than the original paper and their filtering efficiency is not impaired. Due to the increased strength of these papers, they are much more satisfactory than ordinary papers since they can be removed readily from the wet filter cake without tearing. They appear to be equally as good for organic solvents as for water solutions.

Example VI

A piece of size-free cambric is soaked in a solution consisting of 50 grams of the saponified 10:2 vinyl acetate-allylidene diacetate copolymer used in Example II, 150 grams of water and 1 gram of ammonium chloride, blotted to remove excess solution, dried in air overnight and finally baked at 80° C. for thirty minutes. After washing to remove the ammonium chloride, the fabric is very definitely highly sized compared to an untreated piece. This same solution of copolymer is also used as a cement for paper to paper, cellophane to cellophane, wood to wood, cloth to glass and cloth to cloth with favorable results.

Example VII

An aqueous solution containing 15% of a 50–50 mixture of saponified copolymer (mol ratio of vinyl acetate to allylidene diacetate 10:2) and polyvinyl alcohol, when cast into film, gives a perfectly clear film indicating compatibility of the two materials. Such film, on treatment with a 5% aqueous sulfuric acid, saturated sodium sulfate bath at 40° C. for ten minutes becomes insoluble in hot water even though half of the film is made up of a normally water soluble polyvinyl alcohol. This indicates some reaction between polyvinyl alcohol and the aldehyde groups of the copolymer.

Example VIII

Twenty-nine (29) grams of viscose containing 10% cellulose and 6.7% sodium hydroxide were mixed with 8 grams of a 20% aqueous solution of saponified 10:2 vinyl acetate-allylidene diacetate copolymer. The mixture is perfectly clear when thoroughly homogenized. The mixture is cast on a glass plate in the usual way, coagulated and regenerated in a warm 5% aqueous sulfuric acid-saturated sodium sulfate bath and then washed free of acid and dried at 80° C.

In a similar experiment, the mixture is cast on glass, dried in air at 80° C., then regenerated in a 5% sulfuric acid-saturated sodium sulfate bath. The film is washed free of acid, desulfured at 75° C. in a sodium bicarbonate solution, washed again and dried on a support. This film has a very, very slight haze, but is very uniform, indicating substantial compatibility of the two polymers.

Example IX

A sample of saponified copolymer (vinyl acetate-allylidene diacetate 10:2) is mixed with water to give a 33% solution. This mixture is placed on a rubber mill and milled until most of the water has been removed. When milling freely, 3% of phosphoric acid is added to the product on the mill. Its character changes rapidly from the free milling plastic mass to a somewhat friable sheet, indicating the insolubilizing effect of the acid.

Example X

Film is cast from an aqueous solution of saponified 10:1 vinyl acetate-allylidene diacetate copolymer and cut into strips about ½ inch by 8 inches. The strips are held over a hot plate until soft and then stretched by hand to about five times their original length and held under tension until cold. These oriented films will shrink freely when heated free of tension, or if soaked in cold water. Samples of the film which have been stretched five-fold are placed in a 5% sulfuric acid saturated sodium sulfate bath for thirty minutes. This results in about 5% shrinkage. The film is then washed free of acid in cold water, in which case 50% shrinkage of the film takes place, but it is not soluble in water. When finally dried without tension, the insolubilized film is 2.5 times its original length. When resoftened by heat, it is fairly elastic over a short range while hot.

A similar series of experiments is carried out using films containing 60% polyvinyl alcohol and 40% saponified 10:1 vinyl acetate-allylidene diacetate copolymer. These films are likewise stretched over a hot plate to about five times their original length and then insolubilized by treatment in the stretched condition with an acid bath. About 50% of the stretch is "frozen" by the insolubilizing treatment.

In a similar experiment, a sample of film is first treated with the acid bath to insolubilize it, washed free of acid and dried. The insolubilized film, when heated over a hot plate, can be stretched only three times its original length and will completely recover its original length when soaked in cold water.

Example XI

A mixture of methyl methacrylate, vinyl acetate and allylidene diacetate in the mol ratio of 70:10:5 respectively, said mixture having a weight of 100 grams, together with 0.5 gram of benzoyl peroxide is heated on a steam bath to bring about polymerization. Polymerization is not vigorous in this case, but proceeds slowly, as is evidenced by thickening of the solution. The mixture is heated on a steam bath for about twenty hours and the product at that time is a thick, clear, colorless syrup which, upon cooling at room temperature, solidifies to a hard, brittle resin with little evidence of any unpolymerized monomer. A sample of this polymer is saponified as described in Example XIII and then dissolved in methoxyethanol and cast on glass. After drying at 80° C., the film is treated with a hot 5% aqueous solution of sulfuric acid saturated with sodium sulfate, the treatment causing reaction to take place between the alcohol and the aldehyde groups, with the resulting product having a solubility in methoxyethanol less than that of the saponified polymer prior to the acid treatment.

Example XI represents the cross-linking by means of acid hydrolysis of a three-component interpolymer containing both masked aldehyde and masked hydroxy groups.

Example XII

A sample of saponified copolymer (vinyl acetate-allylidene diacetate 10:2) is mixed with water to give a 33% solution. This mixture is placed on a rubber mill and milled until most of the water has been removed. When milling freely, 4% glycol bis[mercaptoethyl]ether (triethylene glycol dimercaptan) is added to the product on the mill. In a very short time, the product is much drier, less plastic and opaque and the somewhat friable sheet which results indicates the production of a cross-linked product by the reaction of the dimercaptan.

Example XIII

A mixture of 100 grams of methyl methacrylate and 32 grams of allylidene diacetate is added to 200 grams of water containing 0.2 gram of sodium bicarbonate and 0.2 gram of polyvinyl alcohol (the same composition as the polyvinyl alcohol used in Example A). The mixture is heated to reflux for fifteen minutes to remove all air and then 0.2 gram of benzoyl peroxide is added while stirring and heating are continued. Within an hour, polymerization is well under way and at the end of four hours, polymerization is complete as evidenced by the rise in boiling point of the solution. The product is cooled to room temperature and is obtained in the form of irregular beads. The final, washed, air dried product is clear and transparent, indicating perfect compatibility and is an interpolymer of allylidene diacetate and methyl methacrylate.

One hundred (100) grams of this interpolymer are dissolved in 200 grams of beta-methoxyethanol and then carefully diluted with 100 grams of methanol. Since methanol is not a solvent for this polymer, this addition almost causes coagulation. Seven (7) grams of sodium methoxide in beta-methoxyethanol are added slowly to this solution to give a pH of 8.0 to 9.0. During heating, the pH slowly drops and additional sodium methoxide is added to keep the pH near 9.0. On cooling, this solution gels. It is warmed up and 100 grams of beta-methoxyethanol added to redissolve the mixture and the final solution is poured into hot water to coagulate the resin. The final polymer is soluble in a mixture of toluol and beta-methoxyethanol. Inasmuch as sodium methylate does not cause alcoholysis of the methyl methacrylate portion of this polymer, the only alcohlysis that can have taken place is that of the allylidene diacetate which sets free the aldehyde groups.

The saponified polymer may be cross-linked by treatment with glycols, diamines or by reaction with cellulose. Thus, the copolymer of methyl methacrylate and allylidene diacetate hydrolyzed as described above in this example is dissolved in beta-methoxyethanol and to the solution 23 grams of hexamethylene diamine are added. Addition of the diamine results in a somewhat more viscous solution, but does not cause gelation. The solution is case into film and baked at 80° C. for twelve hours. The resulting film is swollen but not soluble in beta-methoxyethanol. Another film similarly prepared but dried at 80° C. for two hours is insoluble in beta-methoxyethanol. In a similar experiment, a solution of 100 grams of methyl methacrylate polymer in beta-methoxyethanol is modified with 23 grams of hexamethylene diamine, is cast into film and baked at 100° C. for four hours; this film readily dissolves in beta-methaxyethanol since there are no aldehyde groups in the polymer to be cross-linked.

Example III represents the cross-linking of a two component interpolymer containing aldehyde groups but no hydroxy groups.

*Example XIV*

A solution of polyvinyl alcohol in liquid ammonia is prepared by adding 4.4 grams of polyvinyl alcohol to about 400 grams of ammonia, with good stirring. Two and three-tenths (2.3) grams of sodium, likewise dissolved in liquid ammonia, are added to the above solution and a white precipitate of sodium polyvinyl alcoholate results. The liquid ammonia is evaporated from this product and dry xylene added as a reaction medium. Fifteen and two-tenths (15.2) grams of diethyl chloroacetal are added to this mixture, with good stirring, and the mixture heated on a steam bath for two to three hours. The product of the reaction is still soluble in water, but is quite sensitive to methanol, indicating that a substantial portion of the hydroxyl groups have been substituted. The above polymer is removed from the xylene by filtration and washed to remove excess diethyl chloroacetal.

It is believed that the polymer thus obtained may be shown structurally as follows:

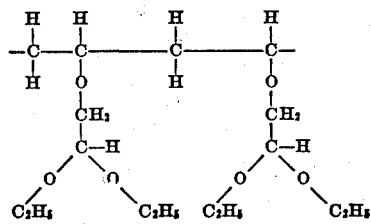

When this polymer in aqueous solution is hydrolyzed by means of acid, the ethyl groups are removed and the aldehyde formed. If any unreacted hydroxyls still exist in the polymer, they will immediately react with some of the free aldehyde groups to form a cross-linked structure.

*Example XV*

A mixture of

| | | |
|---|---|---|
| Acrylonitrile | grams | 40 |
| Allylidene diacetate | do | 5 |
| Vinyl acetate | do | 5 |
| Distilled water | do | 97 |
| Sodium triisopropyl naphthalene beta-sulfonic acid | grams | 2.7 |
| Monosodium phosphate | do | 0.71 |
| Ammonium persulfate | do | 0.086 |
| Metasodium bisulfite | do | 0.043 |
| Sodium hydroxide (0.5 N) | cc | 0.2 | is heated for eighteen hours in a pressure bottle at 23° C. with constant agitation, during which time the mixture polymerizes and precoagulates in the form of a white, grainy polymer which is easily washed free of salt. The dried product weights 39 grams and contains 21.4% nitrogen which corresponds to 81% acrylonitrile in the polymer. This product is soluble in dimethyl formamide, but insoluble in acetone and acetonitrile. A film is cast from this produce by spreading a solution of the polymer in dimethyl formamide on a suitable surface, followed by evaporation of the dimethyl formamide. The film, after removal of the solvent, is stripped from the casting surface and is immersed in a hydrolysis bath consisting of 5% sulfuric acid in water, the pH of the bath being approximately 1.0. The bath is heated to the boiling point for about one hour and the film is left therein at room temperature for an additional two days, after which period the film is insoluble in, but swollen in boiling dimethyl formamide, indicating that as the hydrolysis proceeds in an acid medium, acetal formation also takes place.

*Example XVI*

A copolymer of vinyl benzylidene diacetate and vinyl acetate prepared in a manner similar to the procedure outlined in Example A and subjected to alkaline alcoholysis as described in Example A yields a synthetic linear addition polymeric product having both free aldehyde and free hydroxyls. In this case, the aldehyde is linked to the chain carbon through additional carbon bonds to give the structure:

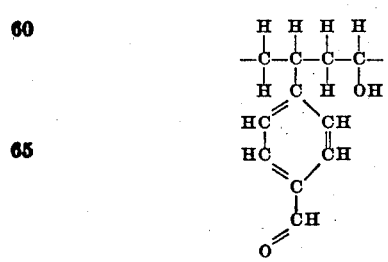

but, upon acid treatment, the cross-linking reactions take place as previously described, as is evidenced by greatly increased insolubility characteristics.

With respect to the polymer-forming reaction, any of the conditions mentioned in my aforesaid copending applications may be utilized. The polymerization catalysts that may be used are those which catalyze the polymerization of vinyl acetate, such catalysts including organic peroxides such as benzoyl peroxide and diethyl peroxide, as well as other per-compounds such as ammonium persulfate (which may be activated by bisulfites such as sodium bisulfite and metasodium bisulfite).

With respect to the splitting off of the masked aldehyde and other groups, any of the conditions for saponification, hydrolysis or alcoholysis described herein and in my said copending application Serial No. 581,340 may be used, the particular conditions not being critical, but being chosen in accordance with the specific nature of the masked aldehyde polymer and the final product desired.

As has been pointed out above, the cross-linking of aldehyde-containing polymers can be accomplished in a number of ways. Where the polymer contains both aldehyde and hydroxy groups, the cross-linking is readily accomplished by treating the polymer either in the solid state or in solution in any suitable solvent, with acid. The acid may be a common mineral acid such as sulfuric, hydrochloric, phosphoric, etc., or may be organic acids, particularly carboxylic acids having a dissociation constant calculated on the first hydrogen between $4 \times 10^{-2}$ and $1.5 \times 10^{-5}$, e. g. glycollic acid, maleic acid, oxalic acid, malonic acid, tartaric acid, salicylic acid, fumaric acid, pyromucic acid, mandelic acid, malic acid, acetic acid, formic acid and lactic acid, as well as organic sulfonic acids. The cross-linking may be effected by the use of salts of a weak base with a strong acid, for example ammonium chloride. The cross-linking reaction may, as illustrated in Example I, be effected by the use of elevated temperature, e. g. 100° to 150° C., without the use of acid, particularly where polymers containing both hydroxyl groups and aldehyde groups are to be cross-linked. When acid is used, the cross-linking reaction is accelerated by the use of elevated temperature, the use of elevated temperature being especially desirable when using weak acids.

While the cross-linking of polymers containing both aldehyde and hydroxyl groups represents a preferred embodiment of the invention, aldehyde group-containing polymers which may or may not contain in their molecules aldehyde reactive groups such as hydroxyls can be cross-linked with compounds containing two or more groups which will react with aldehydes so as to form a bridge by means of such compounds between two or more of the molecules of the aldehyde-containing polymers, this cross-linking reaction being capable of building up quite large molecules. Such bifunctional aldehyde reactive compounds are the polyalcohols such as glycerol, the glycols, polythioalcohols, cellulose, glycol cellulose, lowly substituted cellulose derivatives, cellulose xanthate, polyvinyl alcohol or polyvinyl esters or ethers containing free hydroxy groups, di- or polymercaptans such as 1,2 ethanethiol (ethylene glycol dimercaptan) and glycol bis[mercaptoethyl] ether (triethylene glycol dimercaptan) and the like. This group of bi- or polyfunctional aldehyde reactive compounds reacts with the aldehyde of the polymer in accordance with the following equations to form a single or double link between two chains or to link three chains together:

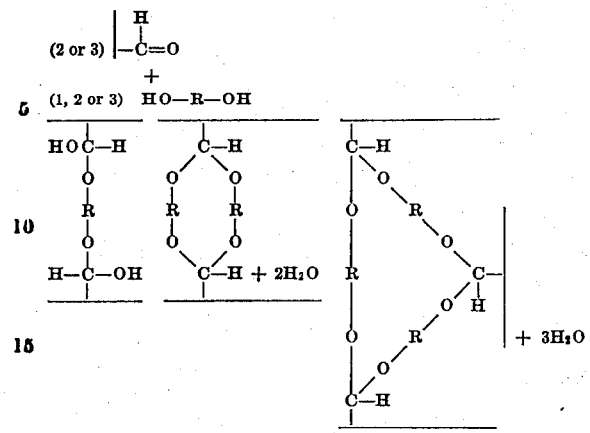

The reaction between the aldehyde-containing polymer and the bifunctional aldehyde reacting compound may readily be effected by the use of dilute aqueous solutions of mineral acids such as sulfuric, hydrochloric and phosphoric, preferably at elevated temperatures, e. g. 80° to 100° C. The cross-linking bifunctional compound may be dissolved in any suitable medium such as water and applied in the presence of a catalyst to the polymer to be cross-linked either in the solid, emulsified or dissolved state.

Another group of bi-or polyfunctional aldehyde reactive compounds which may be used to cross-link the aldehyde-containing polymers, as described and claimed specifically in William W. Watkins Serial No. 630,131, filed November 21, 1945 (now abandoned), are compounds having two or more nitrogen atoms to which are attached reactive hydrogens, this class being represented by hydrazine, phenyl hydrazine, alkylene diamines such as ethylene diamine, tetramethylene diamine and hexamethylene diamine, diamides and polyamides such as urea and thiourea, secondary polyamines such as dimethyl diamines and diethyl diamines, diamidines such as guanidine, triazines such as melamine, tri or polyaminotriazine, tri- or polyoxytriazine and cyanuric acid. Where amines are used as the cross-linking agents, the reaction generally proceeds without the addition of substances to catalyze the reaction. Thus, the aldehyde-containing polymer may be dissolved in a suitable solvent, for example water, where the polymer is water soluble and the bi- or polyfunctional compound may be added to the solution. Heating to a moderate temperature, for example 80° to 100° C., of the mixture will effect the cross-linking in a relatively short time. The solution so formed may be cast or otherwise molded into the desired shape of product and the reaction thereafter carried out to effect cross-linking.

In addition to the cross-linking reactions previously described, cross-linking may be effected by the following reactions:

(a) By means of the aldol reaction (in caustic at a pH of 11.0 to 14.0) provided at least one of the aldehyde groups is attached to the chain through $CH_2$, i. e. where there is an alpha hydrogen. The reaction is illustrated below:

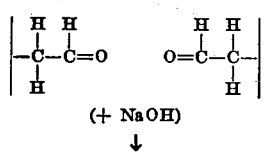

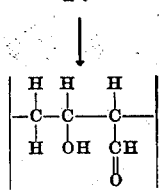

(b) By means of the benzoin reaction which takes place in alkali metal cyanide in the case of alpha-substituted acrolein polymers such as the saponified polymer of alpha-methyl allylidene diacetate. The aldehyde linking is illustrated by the structures set forth below:

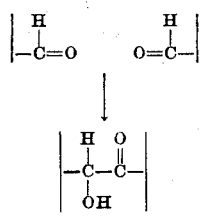

(c) By the Cannizzaro reaction (auto-oxidation and reduction) involving alpha-substituted acrolein polymers such as the saponified polymer of alphamethylacrolein diacetate. For clarity, this reaction is shown in two steps.

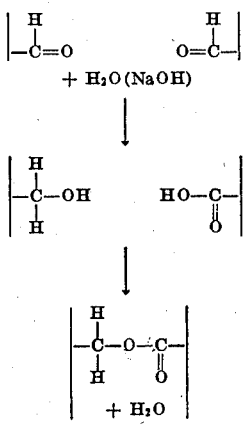

(d) By the Strecker reaction. The chemical formulae of these reactions are illustrated below:

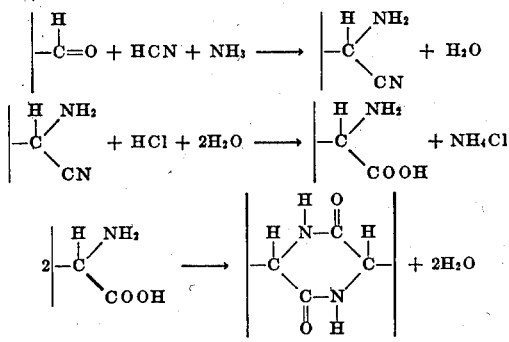

The invention is admirably suited to the production of highly useful shaped articles which are stable under a wide range of conditions, highly resistant to the action of common solvents and, in many instances, highly infusible. Such shaped articles are, for example sheets, films, wrapping tissue, tubing, filaments, bristles, yarns, threads, coatings, finishes, cast and molded articles and adhesives, particularly adhesive layers in laminated products. The shaped articles may, if desired, comprise the cross-linked polymeric materials of this invention admixed with natural or other synthetic polymeric materials or any desired modifying agent which may be added to spinning or casting dopes which are to be formed into the shaped article; e. g. the admixing or modifying material may be added to a spinning or film-forming composition containing the polymer to be subsequently spun or cast into filaments or film. In one form of the invention, a polymer containing masked aldehyde groups may be formed into a shaped article by ordinary molding, shaping or casting methods, for example by spinning or casting by the wet or coagulation method, by the dry or evaporative method, or by melt or fusion methods of spinning or casting, subjected to saponification, hydrolysis or alcoholysis to produce aldehyde groups in the polymer of the shaped article and simultaneously or subsequent to the freeing of the aldehyde groups, undergoing reaction with aldehyde reactive groups to produce cross-linking in the shaped article. Specifically, the interpolymers comprised of vinyl acetate are especially useful in cellulose acetate or other cellulose ester or cellulose ether compositions and when formed structures thereof are converted by saponification into either partially or wholly regenerated cellulose, the aldehyde group-containing polymer will simultaneously be formed, the aldehyde groups of which, if alkaline saponification is used, may subsequently be consumed to effect cross-linking within the structure to render the same stronger, tougher and more resistant chemically. When the cellulose ester is hydrolyzed under acid conditions to remove acetyl groups to whatever desired degree, the masked aldehyde polymer is converted to a polymer having aldehyde groups which are at the same time cross-linked with the hydroxy group of the cellulose compound. In fact, any structure such as is mentioned above as comprised of or containing a masked aldehyde polymer may be converted into an insoluble and difficultly fusible form by unmasking the aldehyde group of the polymer under such acid conditions as will cause it to react and produce cross-links.

It is preferred that the insoluble products of this invention be formed from an aqueous system. Thus, one can obtain water soluble polymers by converting suitable masked aldehyde polymers of the type described above, e. g. the allylidene diacetate-vinyl acetate polymers, by saponification or by alcoholysis in an alkaline medium into the aldehyde-containing, hydroxy-containing polymers which will remain water soluble so long as they are not acidified. These water soluble, aldehyde-containing polymers are likewise readily formed into any desired shape and are admirably suited for use wherever regenerated cellulose or polyvinyl alcohol structures have previously been used. In view of their subsequent simple insolubilization whenever desired which renders the structures water insoluble, these polymers may often be used with greatly improved results. For instance, a water soluble polymer containing both recurring aldehyde and hydroxyl groups is cast, extruded or otherwise formed from an aqueous solution, partially or completely dried and then acidified by dipping into a strong mineral acid bath, such as a 5% sulfuric acid solution saturated with sodium sulfate. (The high concentration of salt is to keep the polyvinyl alcohol portion of the interpolymer coagulated. The solution may not necessarily be saturated with salt, but it should contain as high a concentration of salt as is necessary to keep the polymer from dissolving.) After washing with water until the product is acid free, it is dried in any suitable manner. Sulfuric acid may however be used alone where coagulation from solution is not important, e. g. where the solvent is eventually removed by drying.

Instead of drying or partially drying the formed structure before insolubilizing, an aqueous solution of the polymer containing both aldehyde and hydroxyl groups, alone or admixed with other film- or filament-forming material, may be cast into an acid-salt coagulating bath, washed and then dried. Instead of having the first bath an acid-salt bath, a bath containing only salt may be used to coagulate the structure, after which it may be passed through an acid bath to insolubilize it, which bath should have a sufficiently high salt concentration and to prevent redissolving before the insolubilizing action has had a chance to proceed. In many cases, it is desirable to use the two-step process, that is, first to coagulate without having acid in the bath so as to dehydrate and shrink the structure, following which the structure is acidified.

By having incorporated in the aqueous casting or spinning solution an organic carboxylic acid having a dissociation constant calculated on the first hydrogen between $4 \times 10^{-2}$ and $1.5 \times 10^{-5}$, it will not be necessary to further acidify, but simply dry, or dry and bake the formed structure. In place of incorporating the organic carboxylic acid in the composition to bring about cross-linking and insolubilization, a salt of a weak base with a strong acid such as ammonium chloride may be used with equally good results; or one may use in place of organic acid, a salt such as sodium chloroacetate which does not catalyze the reaction at ordinary temperatures but when the reaction mixture is heated, the sodium chloroacetate decomposes into sodium chloride and acetic acid, the latter acting as a catalyst for the reaction. Also, acidification may be effected by means of acid vapors such as hydrochloric acid vapor. In these processes, it will not be necessary to subject the product to a washing step although in some instances, it may be desirable to do so.

The water soluble polymers resulting from interpolymerization of vinyl acetate and allylidene diacetate in the mol ratio of from about 5:1 to 20:1 and then hydrolyzing by means of alkaline alcoholysis or saponification are generally preferred. Such polymers are compatible with many water soluble cellulose derivatives such as glycol cellulose and other hydroxy ethers of cellulose, lowly etherified and lowly esterified cellulose, certain heat hardenable resins or heat hardenable resin-forming compositions, e. g. urea formaldehyde, melamine formaldehyde, phenol formaldehyde and especially the aldehyde resins of the polyhydroxy phenols. With viscose, these polymers are compatible over a wide range of proportions even though all variations of the water soluble polyvinyl alcohol or partially hydrolyzed polyvinyl acetate are not at all compatible with viscose. Viscose containing such polymers may be extruded or otherwise cast into film, ribbons, caps, bands, tubing or the like, or extruded to form filaments, yarns, horsehairs, etc. Such solutions may be cast or spun in any of the coagulating or coagulating and regenerating baths useful for the spinning of viscose and, prior to regeneration of the viscose and insolubilization of the interpolymer, the structure may be stretched or otherwise worked. The structure will, of course, be washed and purified by any of the known methods and in accordance with the subsequent intended use of the product.

The said water soluble interpolymers may be mixed with viscose in proportions of from 5% to 50%, based on the cellulose content of the viscose and extruded into a buffered phosphate bath of the type described in the copending application of F. B. Cramer and W. F. Underwood Serial No. 484,764, filed April 27, 1943 (now abandoned), such a bath, for example, being one having a pH of between 3.0 and 7.0 containing 10% or more of phosphate ions, calculated as trisodium phosphate, and a large amount of sodium sulfate, the said bath coagulating the interpolymer-viscose compound of the spinning solution. The freshly formed product which will be a yarn where a spinneret is used as the extruding device may then be subjected, prior to regeneration, to stretching in a hot bath as is described in said Cramer and Underwood application, being subsequently acidified to regenerate the cellulose and effect cross-linking of the polymer, with the final product having improved physical characteristics, being obtained with a high stretch, e. g. 150% or more, an increase in length on the basis of the unstretched yarn, increased tenacity with an increase in elongation of 20% to 30% or more, with an increase in flex resistance and improved depth of dyeing.

An aqueous solution of the water soluble aldehyde group-containing interpolymer, with or without the addition of modifying agents, may be applied to base sheets such as paper, cloth, regenerated cellulose film, polyvinyl alcohol film or other water sensitive films as a size or coating. Filter paper may, for example, be greatly improved in strength by treatment with an aqueous solution of this interpolymer which is insolubilized in situ without diminishing its efficacy as a filter. Textile fabrics and yarns, particularly those composed of nylon, impregnated with aqueous solutions of this interpolymer which is insolubilized in situ have a permanent "starched" effect or a permanent finish which is retained even after numerous launderings. Aqueous solutions containing this interpolymer are useful as adhesives for various organic or inorganic substances, e. g. for adhering paper to paper, regenerated cellulose film to itself, wood to wood, cloth to glass, cloth to cloth, etc. Specifically, it has been found that this water soluble interpolymer may be incorporated in the glycerin softener bath for regenerated cellulose or other water sensitive films with greatly improved anchorage of coatings subsequently applied thereto. In this specific application, a small amount of maleic or glycolic acid or the like will be added to the glycerin softener bath along with the interpolymer so that during subsequent drying at an elevated temperature, the polymer is rendered insoluble.

The hydrolyzed interpolymers comprised in part of polyvinyl alcohol can be hot drawn in a manner similar to the drawing of polyvinyl alcohol. Considerable of the increased strength brought about by the drawing is maintained after insolubilization. Furthermore, structures exhibiting strong shrinkage characteristics and well suited for use as shrinkable wrappers, as shrinkable bands or caps for applying around bottle necks, etc., may be obtained by such drawing procedures. Thus, film sheets or other structures formed from these water soluble interpolymers, preferably hydrolyzed polymers formed by interpolymerizing vinyl acetate with allylidene diacetate in the mol ratio of between 8:1 and 15:1 may be drawn as much as 600% and, after insolubilizing, will shrink back to about half the drawn length upon immersion in the water. If the structure is insolubilized without stretching and then subjected to heat and drawing, it may be drawn about 300% of its original length and will retain this new length so long as it is kept cool and dry, but upon heating or wetting out in water, the structure will recover completely its original undrawn dimensions.

Also, the hydrolyzed or saponified polymer containing the aldehyde groups can be reacted with a monomeric dye intermediate containing an aldehyde reactive group. Such polymeric dye intermediates have been found of value in processes of color photography.

The term "polyvinyl alcohol" is generally used throughout this specification to describe a polyvinyl product containing a sufficiently large proportion of hydroxyl groups in the molecule to render the polymer soluble in water which may in some instances be heated, the hydroxyl content being in the neighborhood of 70% or more of the theoretical maximum and obtained, for example, by hydrolyzing polyvinyl acetate until all but a small percentage, e. g. 30% or less, of the theoretical acetyl maximum content is split off.

Any departure from the above description which conforms to the spirit of the invention is intended to be included within the scope of the claims.

I claim:

1. The polymer obtained by reacting aldehyde with hydroxy groups of a hydrolyzed interpolymer of vinyl acetate and allylidene diacetate, said polymer having a molecular weight of at least 1000.

2. The process which comprises reacting the aldehyde groups with the hydroxyl groups of a hydrolyzed interpolymer of vinyl acetate and allylidene diacetate containing both aldehyde and hydroxy groups whereby to effect cross-linking.

3. The process which comprises hydrolyzing in an alkaline medium an interpolymer of vinyl acetate and allylidene diacetate whereby to form aldehyde and alcohol groups in the interpolymer, then treating said interpolymer with acid to effect cross-linking.

EMMETTE FARR IZARD.

REFERENCES CITED

The following references are of record in the file of this patent:

UNITED STATES PATENTS

| Number | Name | Date |
|---|---|---|
| 1,625,852 | Herrmann | Apr. 26, 1927 |
| 1,654,215 | Gams | Dec. 27, 1927 |
| 2,314,972 | Dreyfus | Mar. 30, 1943 |
| 2,352,387 | Hopff | June 27, 1944 |
| 2,404,929 | Seymour | July 30, 1946 |
| 2,443,167 | Minsk | June 8, 1948 |
| 2,473,124 | Adelson | June 14, 1949 |
| 2,485,239 | Izard | Oct. 18, 1949 |
| 2,499,368 | DeGroote | Mar. 7, 1950 |

FOREIGN PATENTS

| Number | Country | Date |
|---|---|---|
| 592,233 | Germany | Feb. 3, 1934 |

OTHER REFERENCES

Ser. No. 395,732, Kern (A. P. C.), published April 20, 1943.